Figures 1, 2, 3:
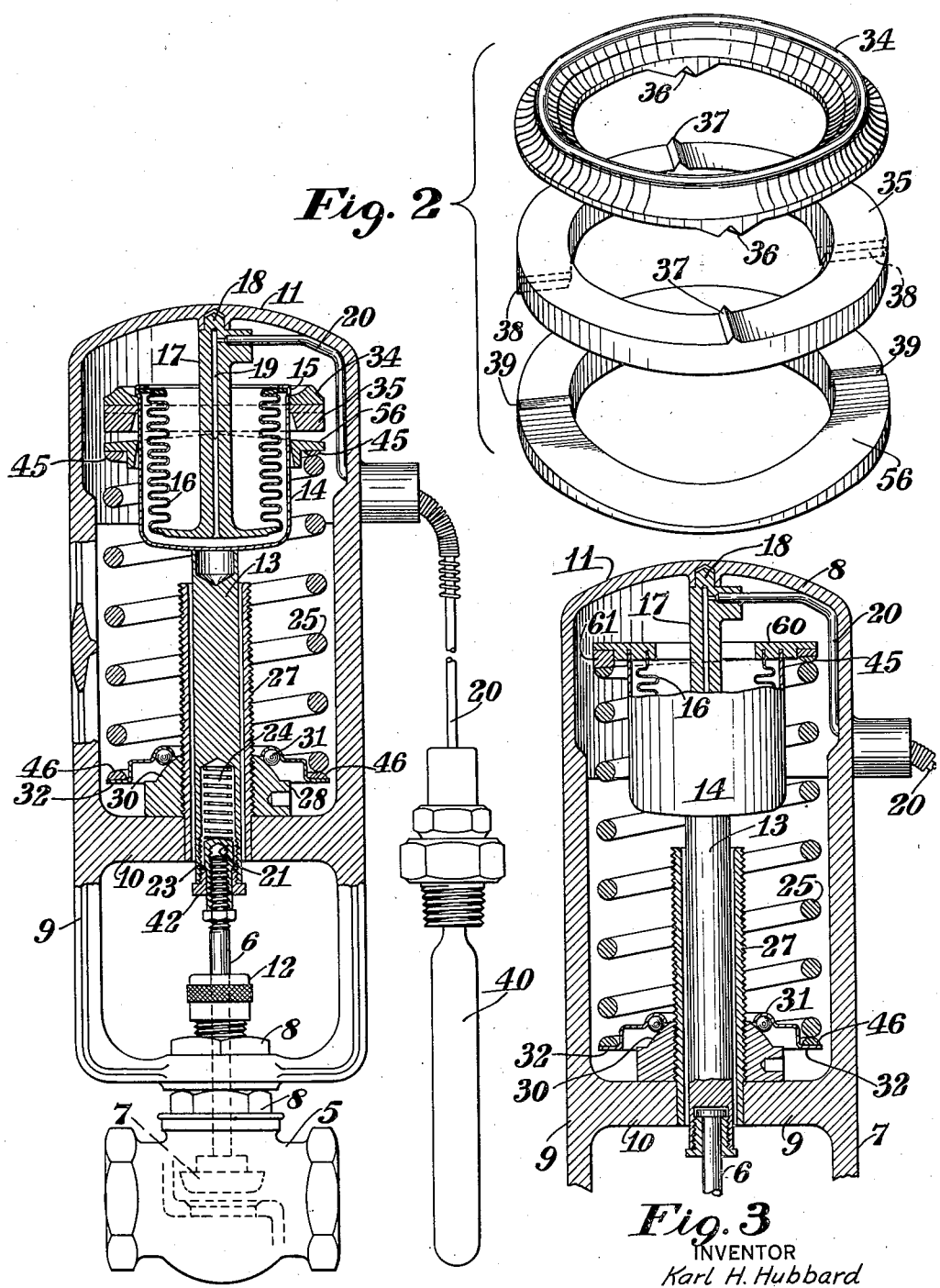

March 26, 1935. K. H. HUBBARD 1,995,390

SELF ACTING REGULATOR

Filed March 1, 1932

INVENTOR
Karl H. Hubbard
BY D. Clyde Jones
ATTORNEY

Patented Mar. 26, 1935

1,995,390

UNITED STATES PATENT OFFICE 1,995,390

SELF-ACTING REGULATOR

Karl H. Hubbard, Rochester, N. Y., assignor to Taylor Instrument Companies, Rochester, N. Y., a corporation of New York Application March 1, 1932, Serial No. 595,993

17 Claims. (Cl. 137—153)

This invention relates to a regulating device and more particularly to a self-acting regulator wherein a valve or other element actuated in response to changes in temperature or pressure serves to regulate the flow of a heating or pressure medium, or to regulate any condition to be controlled.

In self-acting regulators, it is necessary to provide a helical spring to move the valve stem and valve disc of the regulating valve toward the normal position when the pressure or temperature responsive medium in the bulb and capillary system contracts. It should be understood, however, that it is not possible to make a spring with open ends which will not tilt. This tilting develops a side thrust usually carried by the valve stem, whereby friction is introduced between the valve stem and its stuffing box with a consequent retardation of the normal corrective action of the regulator, which tends to build up an objectionable continuous "hunting" condition.

In many installations of self-acting regulators, it is highly desirable that the size of the bulb of the fluid-pressure actuating system, shall be kept small in order to provide quickness of response while at the same time the overall length of the self-acting regulator shall be kept within practical limits. However, the friction present in former devices has required the use of bulbs of relatively large size in order to obtain a commercial degree of operation.

One of the main features of the present invention, therefore, relates to means to compensate for tilting of the actuating helical spring. A further feature of the invention relates to a novel mounting of the actuating helical spring whereby the tilting of this spring under load does not apply a side thrust to the valve stem. An additional feature of the invention relates to the mounting of the bellows or other actuating unit attached to a capillary system, whereby the size of the bulb attached to this capillary system may be diminished without increasing the overall length of the regulator, while at the same time side thrust and the resulting resistance to movement of the actuating stem, are not introduced.

For a clearer understanding of the invention reference is made to the drawing in which Fig. 1 is a side elevation partially in section of a preferred form of the invention; Fig. 2 is an exploded perspective view of a universal mounting unit for use in the regulator illustrated in Fig. 1; and Fig. 3 is a fragmentary view partially in section of a regulator in which the mounting structure illustrated in Fig. 2 has been replaced by a tapered compensating plate of annular form.

Referring especially to Fig. 1, 5 designates a well-known valve structure which may be introduced in a pipe supplying steam or other heated vapor to a retort or chamber (not shown), the temperature or pressure of which is to be regulated. This valve includes a valve stem 6 carrying a valve disc 7 which are movable up and down in a manner to be described, for the purpose of opening and closing the valve. There is mounted on the valve 5 in any suitable manner such as by lock nuts 8, a frame 9 provided intermediate of its length with a cross bar 10 and closed at its top by an integral cup-shaped portion 11. The valve stem 6 passes through a well-known stuffing box 12 mounted in any suitable manner on the body of the valve 5. This valve stem is connected through a resilient protective connection to a drive stem 13 connected to the motor unit of the regulator. The motor unit includes a bellows housing 14 connected at its closed lower end to the upper edge of the rod 13 which is hollowed out, so that its edge may be electrically welded to the housing. The upper portion of this housing is provided with a shoulder 15 by which it is mounted in a support to be described. The free edge of this housing terminates in a horizontal flange attached to the upper edge of a metallic bellows 16 to provide an air-tight joint. The lower edge of this bellows is attached to a pillar 17 secured at 18 in the cup-shaped portion 11 of the frame. It will be noted that this pillar is provided with a passageway 19 leading to a tube 20 which terminates in a bulb 40 containing the temperature-responsive fluid and located in the retort or chamber where the conditions are to be regulated.

The mentioned protective connection between the valve stem 6 and the drive stem 13 includes a stem coupling 21 adjustable on the valve stem, which coupling is engaged at its upper end by the coil spring 24 mounted in the lower hollow end of the driving stem 13. A lock nut 42 threaded into the interior of the hollow portion of the stem 13, serves as a bearing for the stem coupling, and its upper edge also serves as a stop for the shoulder 23 on the coupling to determine the lowermost position of the valve stem 6. By this type of connection, if the motor unit continues to expand after the valve 7 has engaged its valve seat, the spring 22 will take up the additional movement of the driving stem 13 due to the expansion of the motor unit without injuring any parts of the mechanism.

The motor unit is normally held in its contracted position by an open ended helical spring 25, mounted in a manner to be set forth. Helical compression springs are normally made so that their end surfaces 45 and 46 are parallel and perpendicular to the axis therein shown as coinciding with the axis of the driving stem 13. When such a spring is loaded, these end surfaces tend to tilt, causing a side thrust that must be carried by the supporting members for the spring.

The amount of this tilt depends on the load or, in other words, the amount that the spring is compressed, and the direction of the tilt depends largely on the position of the respective ends of the terminating coils. In accordance with the present knowledge, it is not possible to make a spring with open ends that will not tilt and this tilt causes an appreciable side thrust. This side thrust is usually carried by the valve stem and the resulting friction retards the normal movement of the stem so that the actuating bellows such as 16, must build up a force great enough to overcome the static friction between the valve stem and its stuffing box before any actual movement of the valve stem occurs. Since it requires a temperature or pressure change to build up this actuating force, this means that the temperature will fluctuate through a certain small range which may easily amount to several degrees Fahrenheit, without building up enough force to overcome the static friction and to cause a corrective action by the regulator. In many cases this retardation of the normal corrective action of the regulator tends to build up a continuous hunting condition that is especially objectionable in service.

In accordance with the present invention, the effect of the undesirable tilting of spring 25 is obviated by novel upper and lower spring mountings. The lower mounting includes the spring cup 32 provided with ball race for the ball bearings 31 which engage the spherical surface 30 of the tension nut 28. This nut is threaded on the tube 27 which is mounted on the cross bar 10, so that the position of the nut may be adjusted to vary the tension of spring 25. The upper mounting for the spring includes a corrective ring 34 which engages the shoulder 15 of the bellows housing. This corrective ring is supported by cooperating knife edge elements 36 and 37 on an intermediate corrective ring 35. This last-named ring is similarly supported on a lower corrective ring 56 by means of knife edge elements 38 and 39, positioned at right angles to the first-mentioned elements. The ring 56, in turn, is supported directly on the upper end of spring 25. It will be noted that the rings 34, 35 and 56 surround the bellows housing 14 and constitute a corrective coupling between the upper end of the spring and the bellows housing which forms a part of the unit for actuating the valve stem. With these substantially universally movable couplings for the upper and lower ends of the spring, its resultant force, irrespective of any tilting action, is applied along a line coinciding with the axis of the valve stem 6. It will be understood that the universal couplings function to reduce substantially to zero any forces developed by the spring at right angles to its principal axis.

The modified form of the invention shown in Fig. 3 differs from the regulator shown in Fig. 1, in that a different form of compensating means is interposed between the upper end of the spring 25 and the motor unit of the regulator including the bellows housing 14 and the bellows 16. The edges of the housing 14 and the bellows 16 are secured by an air-tight joint to the annular plate 60 which is provided with a downwardly extending annular shoulder. In this modification, there is interposed between the annular plate 60 and the upper coil 45 of the spring, a tapered or wedge-shaped compensating ring 61 positioned as shown in Fig. 3 with respect to the end of last coil of the spring. It will be understood that the use of such a tapered compensating ring while generally satisfactory, is not as good as the arrangement shown in Fig. 1 because the upper end of spring 25 causes some side thrust, except at the exact load for which the sloped or tapered ring 61, is made. Since the slope of this ring is corrected only for one load, it should be designed for the average load to which the spring is subjected. It will be obvious that the same result could be obtained by giving the spring end 45 the same slope as is attained by the compensating ring 61, in which case the end of the spring would be perpendicular to the spring axis only when subjected to the load for which it was compensated. The remainder of the regulator is identical with the structure shown in Fig. 1.

It will be understood that the support for the lower end of the spring, which support includes the tension nut 30, spring cup 32 and the ball bearings 31, may be replaced by a tapered compensating ring similar to 61 and properly positioned with respect to the end 46 of the lower portion of the spring.

The present disclosure is merely typical of applicant's invention and it will be understood that there may be numerous variations and modifications thereof, all within the scope of the following claims, without departing from the inventive concept.

I claim:

1. In a regulating device, a valve including a valve stem and a valve disc, means including a coil spring mounted to move said valve stem and valve disc, fluid-pressure actuated means operating through said coil spring for moving said valve stem and valve disc against the action of said spring, and rocking means for applying the force of said spring to said valve stem parallel to the axis thereof irrespective of the tilting of said spring.

2. In a regulating device, a valve including a valve stem and a valve disc, a coil spring mounted to move said valve stem and valve disc in one direction, fluid-pressure actuated means operating through said coil spring for moving said valve stem and valve disc in the opposite direction against the tension of said spring and floating means to compensate for the tilting of said spring whereby the force thereof is applied to the valve stem parallel to the axis thereof.

3. In a regulating device, a valve including a valve actuating member and a valve disc, a coil spring surrounding a portion of said valve actuating member, said spring serving to move said valve-actuating member and valve disc, fluid-pressure actuated means connected within said spring to said valve-actuating member for moving said valve-actuating member and valve disc against the tension of said spring, and articulated means for applying the resultant force of said spring along a line coinciding with the main axis of said valve-actuating member irrespective of the tilting of said spring.

4. In a regulating device, a valve including a valve stem and a valve disc, a coil spring mounted to move said valve stem and valve disc in one direction, fluid-pressure actuated means operating through said spring for moving said valve stem and valve disc in the opposite direction against the tension of said spring, and means including a universally movable mounting for the lower end of said spring whereby the resultant force of said spring is applied along a line coinciding with the axis of said valve stem.

5. In a regulating device, a valve including a valve stem and a valve disc, a coil spring mounted to move said valve stem and valve disc, fluid-pressure actuated means operating through said spring for moving said valve stem and valve disc against the tension of said spring, and means including a universally movable mounting at the top of the spring for applying to the valve stem the resultant force of said spring along a line coinciding with the axis of the valve stem.

6. In a regulating device, a valve including a valve stem and a valve disc, a coil spring mounted to move said valve stem and valve disc, fluid-pressure actuated means operating through said spring for moving said valve stem and valve disc against the tension of said spring, and means including a universally movable joint provided with ball bearings whereby the resultant force of said spring is applied to the valve stem along a line coinciding with the axis thereof, irrespective of tilting action of said spring.

7. In a regulating device, a valve including a valve stem and a valve disc, a coil spring mounted to move said valve stem and valve disc, fluid-pressure actuated means operating through said spring for moving said valve stem and valve disc against the tension of said spring, and means for applying the force of said spring parallel to the axis of said valve stem irrespective of the tilting action of said spring, said means including a ball bearing support at the lower end of the spring and a knife-edge connection between the upper end of said spring and said valve stem.

8. In a regulating device, a valve including a valve stem and a valve disc, a coil spring surrounding an extension of the valve stem, a motor diaphragm mounted within said spring and having a movable portion, a connection between said motor diaphragm and said valve stem, and a universally movable mounting for the movable portion of said diaphragm on at least one end of said spring whereby side thrust on said valve stem due to tilting of said spring is obviated.

9. In a regulating device, a valve including a valve stem and a valve disc, an actuating stem joined to said valve stem by a resilient protective connection, means including a spring mounted to move said valve stem and valve disc in one direction, fluid-pressure actuated means for moving said actuating stem, said valve stem and said valve disc against the action of said spring, and floating means for applying the force of said spring parallel to the axis of said valve stem irrespective of the tilting of said spring.

10. In a regulating device, a valve including a valve stem and a valve disc, a coil spring mounted to move the valve stem and valve disc, fluid-pressure actuated means operating through said spring for moving said valve stem and valve disc against the tension of said spring, and means for applying the force of said spring parallel to the axis of said valve stem irrespective of the tilting action of said spring, said means including a tapered member in the connection between the upper end of said spring and said valve stem.

11. In a regulating device, a valve including a valve stem and a valve disc, a coil spring mounted to move the valve stem and valve disc, fluid-pressure actuated means operating through said spring for moving said valve stem and valve disc against the tension of said spring, and means for applying the force of said spring parallel to the axis of said valve stem irrespective of the tilting action of said spring, said means including a universally movable support for the lower end of the spring and a tapered plate in the connection between the upper end of said spring and said valve stem.

12. In a regulating device, a controlling element, an expansible bellows for moving said element in accordance with a condition to be regulated, a coil spring surrounding a portion of said bellows and serving to move said element in opposition to said bellows, the geometric axis of said spring coinciding with the geometric axis of said bellows, and means including a universal joint mounting for at least one end of said spring.

13. In a regulating device, a controlling element, an expansible bellows for moving said element in accordance with a condition to be regulated, a coil spring surrounding a portion of said bellows and serving to move said element in opposition to said bellows, the geometric axis of said bellows coinciding with the geometric axis of said spring, and means including a universal joint mounting for each end of said spring.

14. In a regulating device, a valve including a valve stem and a valve disc attached to said valve stem, a frame attached to said valve, a spiral spring, supporting means including a universally movable joint for the lower end of said spring mounted on said frame, motor mechanism, a connection from said valve stem passing through a portion of said spring to said motor mechanism, and supporting means including a gimbal joint for said motor mechanism resting on the upper end of said spring, said supporting means serving to apply the force of said spring parallel to the axis of said valve stem irrespective of the tilting of said spring.

15. In a regulating device, a valve including a valve stem and a valve disc attached to said valve stem, a frame attached to said valve, a spiral spring, supporting means for the lower end of said spring mounted on said frame, motor mechanism, a connection from said valve stem passing through a portion of said spring substantially along the axis thereof to said motor mechanism, and supporting means for said motor mechanism resting on the upper end of said spring, at least one of said supporting means including a gimbal joint for applying a force of said spring parallel to the axis of said valve stem irrespective of the tilting of said spring.

16. In a regulating device including a valve stem and a valve disc, a frame attached to said valve, a spiral spring supported by a universally movable mounting on a portion of said frame, fluid pressure actuated means, a universally movable mounting supporting said fluid pressure actuating means on the upper end of said spring, and means extending within the convolutions of said spring for connecting said valve stem to said fluid pressure actuated means.

17. In a regulating device, an element to be actuated, means including a coil spring mounted to move said element in one direction, fluid-pressure actuated means in part surrounded by said spring for moving said element against the action of said spring, and freely yieldable means for applying the force of said spring to said element along the main axis thereof irrespective of the tilting of said spring.

KARL H. HUBBARD.